United States Patent
Nishida et al.

(10) Patent No.: US 6,665,162 B2
(45) Date of Patent: Dec. 16, 2003

(54) APPARATUS FOR DETERMINING FAILURE OF ELECTROMAGNETIC CLUTCH

(75) Inventors: Kenzo Nishida, Saitama-ken (JP); Norihisa Nihanda, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 308 days.

(21) Appl. No.: 09/820,931

(22) Filed: Mar. 30, 2001

(65) Prior Publication Data

US 2001/0027907 A1 Oct. 11, 2001

(30) Foreign Application Priority Data

Apr. 3, 2000 (JP) ......................................... 2000-100587

(51) Int. Cl.[7] .......................... H02H 3/18; H01H 47/00
(52) U.S. Cl. ......................... 361/81; 361/152; 123/490
(58) Field of Search .............................. 361/81, 42, 45, 361/49, 194, 205, 152, 146; 123/361, 585, 339.22, 490

(56) References Cited

U.S. PATENT DOCUMENTS 5,251,091 A * 10/1993 Ito et al. ........................ 361/152
5,951,616 A * 9/1999 Chiba et al. ................... 701/58

* cited by examiner

Primary Examiner—Rajnikant B. Patel
(74) Attorney, Agent, or Firm—Armstrong, Kratz, Quintos, Hanson & Brooks, LLP

(57) ABSTRACT

An apparatus for determining a failure of an electromagnetic clutch, which is capable of properly determining whether or not a failure, a typically a layer short-circuit, has occurred due to a change in a resistance value of a solenoid coil of the electromagnetic clutch. The electromagnetic clutch is configured such that the engagement force thereof is varied according to an amount of current flowing through the coil. An output control value for control of the amount of current is calculated by feedback control such that an actual amount of current actually flowing through the coil becomes equal to a desired amount of current. A predetermined reference control value is stored which defines a standard for the output control value and has a standard relationship with respect to the amount of current. The actual amount of current is detected. The calculated output control value is compared with the predetermined reference control value corresponding to the detected actual amount of current. It is determined based on a result of the comparison by the comparison means whether or not the electromagnetic clutch has failed due to a change in a resistance value of the coil of the solenoid thereof.

8 Claims, 6 Drawing Sheets

APPARATUS FOR DETERMINING FAILURE OF ELECTROMAGNETIC CLUTCH

BACKGROUND OF THE INVENTION

1. Field of the Invention

This invention relates to an apparatus for determining a failure of an electromagnetic clutch, and more particularly to an apparatus for determining a failure of an electromagnetic clutch having a solenoid whose coil is energized in a manner such that the amount of current supplied to the coil is feedback-controlled to a desired amount of current.

2. Description of the Related Art

Conventionally, an electromagnetic clutch has been proposed, e.g., in Japanese Laid-Open Patent Publication (Kokai) No. 10-196685 by the present assignee. The electromagnetic clutch has a solenoid comprised of an annular coil of a winding circumferentially wound in layers, an annular coil housing for receiving the coil therein, and an armature arranged close to one axial end of the coil housing. When current is supplied to the coil, a magnetic circuit is formed to attract the armature to the coil housing by an attractive force generated by the magnetic circuit, whereby an engaged state of the electromagnetic clutch is established. Further, by controlling the amount of current supplied to the coil, the density of magnetic flux is varied to change the magnitude of the attractive force of the armature, whereby the engagement force of the electromagnetic clutch is controlled.

Further, it is also known that in order to control the above engagement force of the electromagnetic clutch to a desired engagement force, a desired amount of current (desired current amount) corresponding to the desired engagement force is calculated, and an actual amount of current (actual current amount) actually flowing through the coil is detected, whereby the value of a duty factor of current supplied to the coil is feedback-controlled such that the actual current amount becomes equal to the desired current amount.

In the electromagnetic clutch constructed as above, however, the winding of the coil can be partly short-circuited, causing a so-called "layer short-circuit" in which the resistance value of the coil is reduced, e.g., by half. Once the layer short-circuit occurs, even if the actual current amount for the coil is made equal to the desired current amount by feedback control, the density of the magnetic flux is reduced, which hinders the required engagement force from being generated by the electromagnetic clutch. This kind of inconvenience is encountered not only in the case of the layer short-circuit or the like in which the resistance value of the coil is decreased but also in a case where the same is increased for some reason so long as the resistance value is varied to such an extent as permits the actual current amount to become equal to the desired current amount. In this case as well, it is impossible to for the electromagnetic clutch to produce an appropriate engagement force.

SUMMARY OF THE INVENTION

It is an object of the invention to provide an apparatus for determining a failure of an electromagnetic clutch, which is capable of properly determining whether or not a failure, typically a layer short-circuit, has occurred due to a change in the resistance value of a solenoid coil of the electromagnetic clutch.

To attain the above object, the present invention provides an apparatus for determining a failure of an electromagnetic clutch including a solenoid having a coil, the electromagnetic clutch being configured such that an engagement force thereof is varied according to an amount of current flowing through the coil of the solenoid, and that an output control value for control of the amount of current is calculated by feedback control such that an actual amount of current actually flowing through the coil becomes equal to a desired amount of current.

The apparatus according to the present invention comprises:

storage means for storing a predetermined reference control value defining a standard for the output control value, the predetermined reference control value having a standard relationship with respect to the amount of current;

actual current amount detection means for detecting the actual amount of current;

comparison means for comparing the calculated output control value with the predetermined reference control value corresponding to the detected actual amount of current; and failure determination means for determining based on a result of the comparison by the comparison means whether or not the electromagnetic clutch has failed due to a change in a resistance value of the coil of the solenoid thereof.

According to this apparatus, the predetermined reference control value as the standard of the output control value, which has a standard relationship with respect to the amount of current flowing through the coil of the solenoid, is stored in the storage means. Further, the output control value for control of the amount of current supplied to the coil is calculated by feedback control such that the actual amount of current detected by the actual current amount detection means becomes equal to the desired amount of current. Then, the comparison means compares the calculated output control value with the predetermined reference control value corresponding to the detected actual amount of current. The failure determination means determines based on a result of the comparison whether or not the electromagnetic clutch has failed due to a change in the resistance value of the coil.

As the resistance value of the coil is changed, the output control value (duty factor value of pulse current, for instance) mentioned above is calculated by feedback control such that it varies with and compensates for the change in the resistance value of the coil to thereby cause the actual amount of current to become equal to the desired amount of current. Therefore, the difference between the calculated output control value and the predetermined (standard) reference control value corresponding to the detected actual amount of current reflects a degree of the change in the resistance value of the coil. Hence, by comparing the output control value with the predetermined reference control value, it is possible to properly determine whether or not the electromagnetic clutch has failed due to a change in the resistance value of the coil.

Preferably, the apparatus further includes coil temperature detection means for detecting a temperature of the coil, and the comparison means compares a value of at least one of the output control value and the predetermined reference control value, which is corrected according to the detected temperature of the coil, with another of the output control value and the predetermined reference control value.

As the temperature of the coil is changed, the resistance value of the coil is also changed, which changes the amount of current flowing through the coil. Accordingly, the output control value calculated for an identical desired amount of current is changed compared with a case in which the temperature of the coil remains the same. To cope with this, according to the preferred embodiment of the invention, at least one of the output control value and the reference control value is corrected according to the detected temperature of the coil, and then the comparison is made, whereby it is possible to more properly determine a failure of the electromagnetic clutch.

Preferably, the comparison means compares a value of at least one of the output control value and the predetermined reference control value, which is corrected according to a voltage applied to the coil, with another of the output control value and the predetermined reference control value.

As the voltage applied to the coil is changed, the output control value calculated for an identical desired amount of current is changed compared with a case in which the voltage remains the same. To cope with this, according to the preferred embodiment of the invention, at least one of the output control value and the reference control value is corrected according to the voltage applied to the coil, and then the comparison is made, whereby it is possible to more properly determine a failure of the electromagnetic clutch.

Preferably, the apparatus further includes failure determination inhibition means for inhibiting failure determination from being carried out by the failure determination means when the desired amount of current is equal to or smaller than a first predetermined value or when a difference between the desired amount of current and the actual amount of current is equal to or larger than a second predetermined value.

According to this preferred embodiment, execution of failure determination is inhibited by the failure determination inhibition means when the desired amount of current is equal to or smaller than the first predetermined value or when the difference between the desired amount of current and the actual amount of current is equal to or larger than the second predetermined value. When the desired amount of current is small, the output control value calculated based on the desired amount current is prone to variation, and hence an error is liable to occur in failure determination which is carried out by comparing the output control value with the reference control value. Further, the failure determination according to the invention is carried out on the precondition that the actual amount of current has converged on the desired amount of current, and by comparing the output control value calculated in this state of the actual amount of current with the predetermined reference control value. Unless the precondition is satisfied, an erroneous determination of a failure is also liable to occur. Therefore, by inhibiting failure determination in these cases, it is possible to prevent an erroneous determination of a failure of the electromagnetic clutch.

For instance, when the calculated output control value is larger than the predetermined reference control value, the comparison means further compares the output control value with an increased-side reference control value, the increased-side reference control value being obtained by increasing the predetermined reference control value to a predetermined extent, whereas when the calculated output control value is smaller than the predetermined reference control value, the comparison means further compares the output control value with a decreased-side reference control value, the decreased-side reference control value being obtained by decreasing the predetermined reference control value to a predetermined extent.

Preferably, the predetermined reference control value is defined as a value of the output control value to be assumed with respect to the actual amount of current when the coil is under a normal temperature condition, and at the same time a voltage applied to the coil is a normal voltage.

Preferably, the storage means stores the predetermined reference control value in the form of a table of values of the predetermined reference control value correlated to respective values of the actual amount of current.

The above and other objects, features, and advantages of the invention will become more apparent from the following detailed description taken in conjunction with the accompanying drawings.

DETAILED DESCRIPTION OF THE PREFERRED EMBODIMENTS

Figure 1:
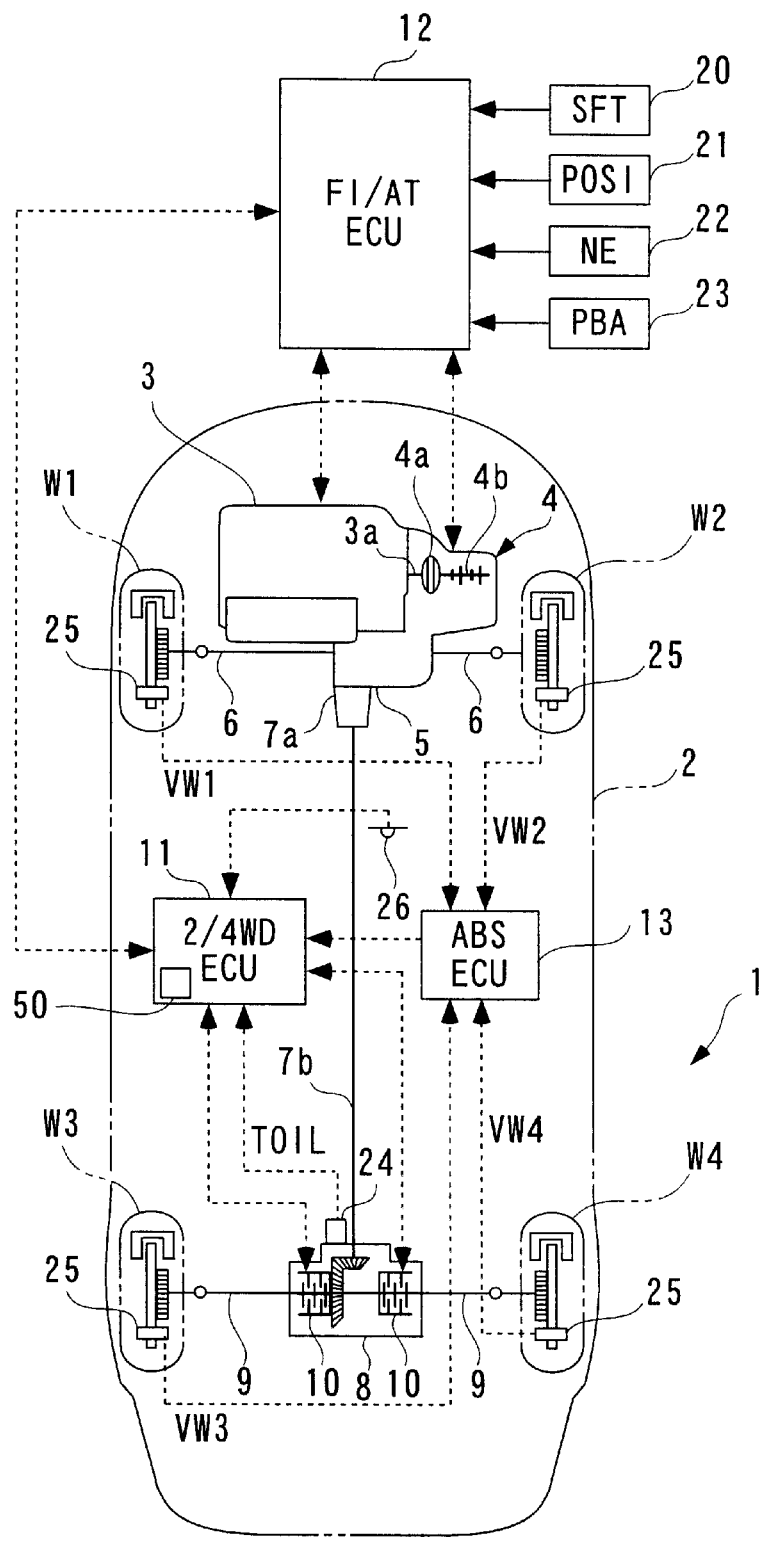
FIG. 1 is a block diagram schematically showing the arrangement of a four-wheel drive vehicle incorporating an apparatus for determining a failure of an electromagnetic clutch, according to an embodiment of the invention.

The invention will now be described in detail with reference to the drawings showing a preferred embodiment thereof Referring first to FIG. 1, there is schematically shown the arrangement of a four-wheel drive vehicle 2 incorporating an apparatus 1 for determining a failure of electromagnetic clutches, according to the invention. As shown in the figure, this four-wheel drive vehicle (hereinafter referred to as "the vehicle") 2 includes an engine 3 transversely mounted in a front part thereof and an automatic transmission 4 associated with the engine 3.

The automatic transmission 4 includes a torque converter 4a for transmitting an output power of the engine 3 to the automatic transmission 4, a shift lever, not shown, which is capable of selecting any one of eight shift positions of "1" to "D5", "N", "R", "P", and a gear mechanism 4b, partly shown, which can be shifted to six gear positions associated respective change gear ratios, i.e. first to fifth speed gear positions and a reverse gear position.

The automatic transmission 4 has a gear position sensor 20 and a shift position sensor 21 mounted therein. The gear position sensor 20 detects a gear position, and delivers a signal SFT indicative of the detected gear position to an FI/AT·ECU 12, referred to hereinafter. Further, the shift position sensor 21 detects a shift position of the automatic transmission 4, and delivers a shift position signal POSI indicative of the detected shift position to the FI/AT·ECU 12.

The above FI/AT·ECU 12 is formed by a microcomputer including a RAM, a ROM, a CPU, and an I/O interface, none of which are shown, and controls the operation of the engine 3 and that of the automatic transmission 4. Connected to this FI/AT·ECU 12 are an engine rotational speed sensor 22 and an intake pipe absolute pressure sensor 23. These sensors 22, 23 sense an engine rotational speed NE and an intake pipe absolute pressure PBA, and deliver respective signals indicative of the sensed engine rotational speed NE and intake pipe absolute pressure PBA to the FI/AT·ECU 12.

On the other hand, the engine 3 has an output shaft 3a connected to left and right front wheels W1, W2 which serve as main drive wheels, via the automatic transmission 4, a front differential 5, and left and right front drive shafts 6, 6. The output shaft 3a is also connected to left and right rear wheels W3, W4 which serve as auxiliary drive wheels, via the automatic transmission 4, the front differential 5, a transfer 7a, a propeller shaft 7b, a rear differential 8, and left and right rear drive shafts 9, 9.

Wheel speed sensors 25 are provided for the front and rear wheels W1 to W4, respectively. These four wheel speed sensors 25 detect respective wheel speeds VW1 to VW4 of the wheels W1 to W4, and deliver signals indicative of the detected wheel speeds VW1 to VW4 to an ABS·ECU 13. The ABS·ECU 13 is formed by a microcomputer, similarly to the FI/AT·ECU 12 described above, and carries out anti-lock control of the front and rear wheels W1 to W4.

Figure 2:
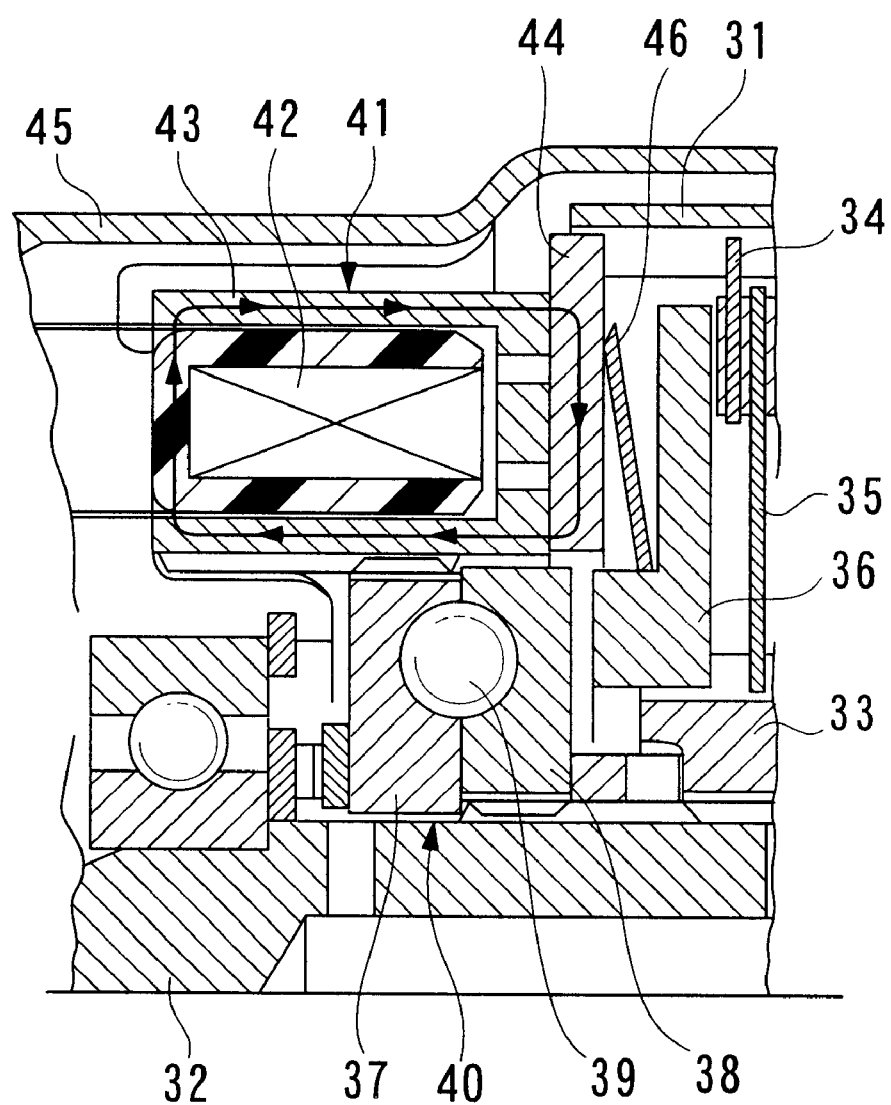
FIG. 2 is a fragmentary sectional view of one of electromagnetic clutches appearing in FIG. 1.

Further, left and right electromagnetic clutches 10, 10 are provided for the rear differential 8. The electromagnetic clutches 10, 10 are identical in construction, so that in the following, the construction of the left-hand side electromagnetic clutch 10 will be described by way of example with reference to FIG. 2 showing a half portion thereof. As shown in the figure, the left electromagnetic clutch 10 includes a clutch outer 31 which is splined to a left end of a clutch drive shaft, not shown, connected to the propeller shaft 7b, a clutch inner 33 which is splined to a right end of a left output shaft 32 connected to the left rear drive shaft 9, a plurality of clutch disks 34 (only one of them is shown in the figure), supported on an inner periphery of the clutch outer 31, a plurality of clutch plates 35 (only one of them is shown in the figure), which are supported on an outer periphery of the clutch inner 33 for alternately mating with the clutch disks 34, and a clutch piston 36 supported on the outer periphery of the clutch inner 33.

Further, arranged at a location outward of the left output shaft 32 is a ball cam mechanism 40 comprised of a stationary cam member 37, a movable cam member 38, and a plurality of balls 39 (only one of them is shown in the figure). The stationary cam member 37 has an outer periphery thereof splined to a radially inner-side periphery of a radially inner-side wall of a coil housing 43 having a hollow annular cross-section, referred to hereinafter, and the movable cam member 38 has an inner periphery thereof splined to an outer periphery of the left output shaft 32. A solenoid 41 is arranged at a location outward of the ball cam mechanism 40. The solenoid 41 is comprised of an annular coil 42 having a winding, not shown, circumferentially wound in layers, the annular coil housing 43 containing the coil 42, and an armature 44 arranged close to an axial end of the coil housing 43. The coil 42 is rigidly fixed to a left side casing 45 by fixing means, not shown, and the coil housing 43 is supported on the left output shaft 32 via the ball cam mechanism 40. Further, the armature 44 has an outer periphery thereof splined to the clutch outer 31, and has a right-hand side surface thereof opposed to the clutch piston 36 by way of a disk spring 46 interposed therebetween.

According to the construction described above, in a deenergized state of the coil 42 in which no current is supplied to the coil 42 of the solenoid 41, the armature 44 can perform relative rotation with respect to the coil housing 43, so that the rotational motion of the engine 3 transmitted to the armature 44 via the propeller shaft 7b and the clutch outer 31 is not transmitted to the coil housing 43 to place the electromagnetic clutch 10 in a disengaged state. In this disengaged state of the clutch 10, drive torque from the engine 3 is transmitted to the front wheels W1, W2 alone, whereby the vehicle 2 is set to a front-wheel drive mode.

On the other hand, when the coil 42 of the solenoid 41 is energized by a drive signal(pulse current) from a 2–4WD·ECU 11, referred to hereinafter, the armature 44 is attracted to the coil housing 43, whereby the rotational motion of the engine 3 is transmitted from the armature 44 to the stationary cam member 37 of the ball cam mechanism 40 via the coil housing 43. In accordance with rotation of the stationary cam member 37, the balls 39 push the movable cam member 38 rightward as viewed in the figure for moving the same, and the movable cam member 38 in turn pushes the clutch piston 36 rightward, whereby the plurality of clutch disks 34 and clutch plates 35 are caused to mate with each other. This establishes the direct connection between the clutch outer 31 and the clutch inner 33 to place the clutch 10 in an engaged state.

In the engaged state of the clutch 10, the drive torque of the engine 3 is transmitted to the left rear drive shaft 9 via the clutch outer 31, the clutch inner 33 and the left output shaft 32. When the left and right electromagnetic clutches 10, 10 are placed in the engaged state, the torque of the engine 3 is also transmitted to the left and right rear wheels, W3, W4, whereby the vehicle 2 is set to a four-wheel drive mode. Further, by controlling the amount of current supplied to the coil 42 of each electromagnetic clutch 10, the engagement force of the clutch 10 can be changed, whereby torques transmitted to the rear wheels W3, W4 can be controlled independently of each other.

In the rear differential 8, an oil temperature sensor 24 (coil temperature detection means) is mounted for detecting a temperature (oil temperature) TOIL of lubricating oil lubricating the electromagnetic clutches 10, 10, as a temperature representative of temperatures of the coils of the electromagnetic clutches. A signal indicative of the detected oil temperature TOIL is delivered to the 2–4WD·ECU 11. A signal indicative of an operating state of a lock switch 26 is also supplied to the 2–4WD·ECU 11 from the lock switch 26. This lock switch 26 is operated to cause the 2–4WD·ECU 11 to carry out a lock mode for locking the rear differential 8 when the vehicle 2 escapes from a stuck condition on a snowy road.

The above 2–4WD·ECU 11 which forms a main or essential part of the apparatus 1 for determining a failure of the electromagnetic clutches 10, 10, according to the invention is implemented or formed by a microcomputer, similarly to the FI/AT•ECU 12 and the ABS•ECU 13. The 2–4WD·ECU 11 receives signals indicative of sensor output values from the above sensors 20 to 25 and signals indicative of results of operations using the sensed parameter values, through serial communications. Further, the 2–4WD·ECU 11 includes a current detection circuit 50 which detects a value ILOLM of actual current actually flowing through the coil 42 of each electromagnetic clutch 10.

The 2–4WD·ECU 11 calculates torques to be transmitted to the rear wheels W3, W4 based on these signals, by executing control programs read from the ROM, using values of flags and computational values, referred to hereinafter, stored in the RAM. Then, the 2–4WD·ECU 11 calculates desired values ICMDL of current to be supplied to the coils 42 of electromagnetic clutches 10 based on the calculated torques. Next, the 2–4WD·ECU 11 calculates values DYOUTLM of output duty factors of drive current (pulse current) to be supplied to the respective coils 42 by feedback control such that the detected actual current values ILOLM become equal to the respective desired current values ICMDL, and delivers drive signals formed according to the results of calculations, to the electromagnetic clutches 10, 10 for control of them. Further, the 2–4WD·ECU 11 carries out a failure determination process, described hereinbelow, for determining a failure of the electromagnetic clutches 10.

Figure 3:
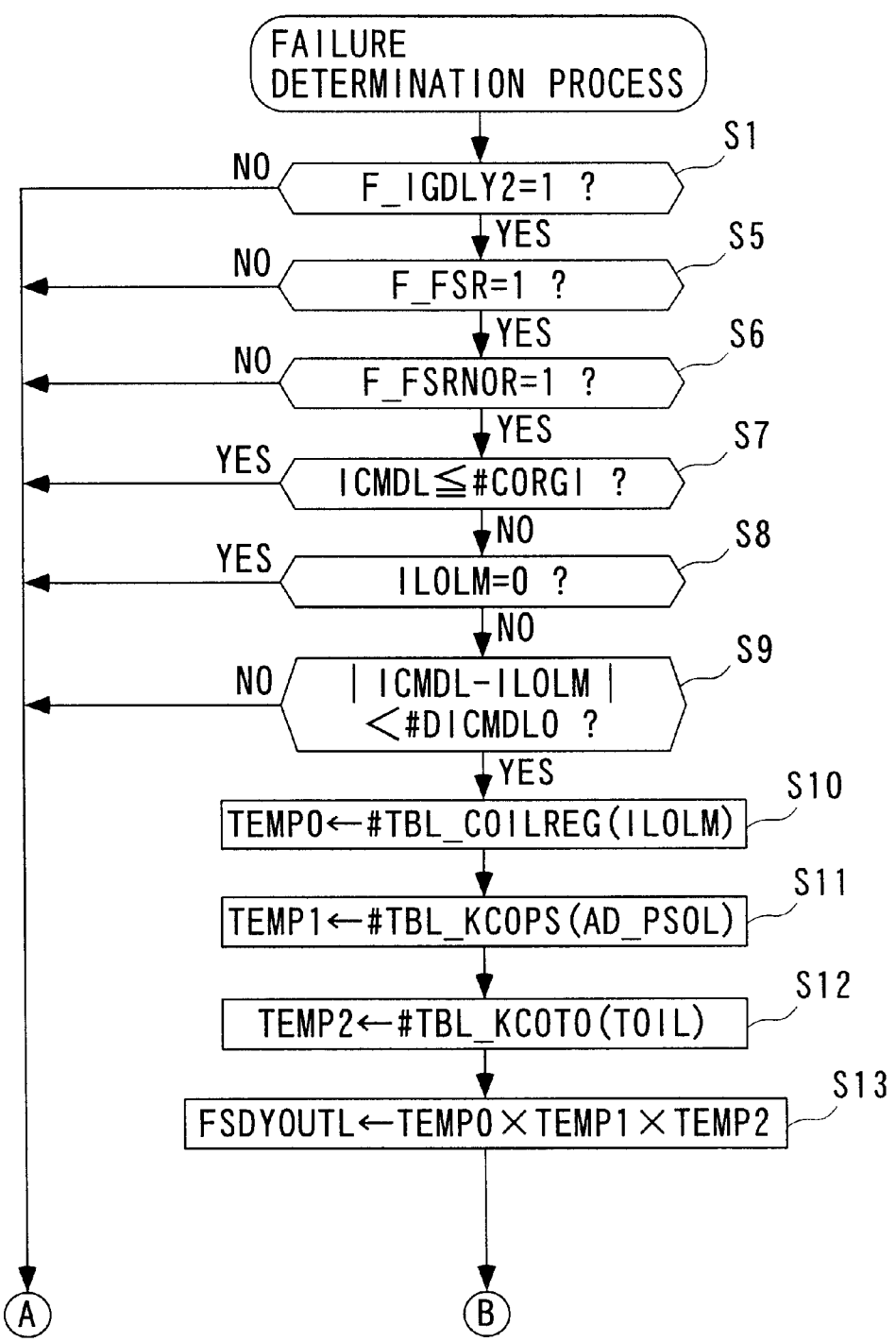
FIG. 3 is a flowchart showing a control program for carrying out a failure determination process for determining whether or not the electromagnetic clutch has failed.
Figure 4:
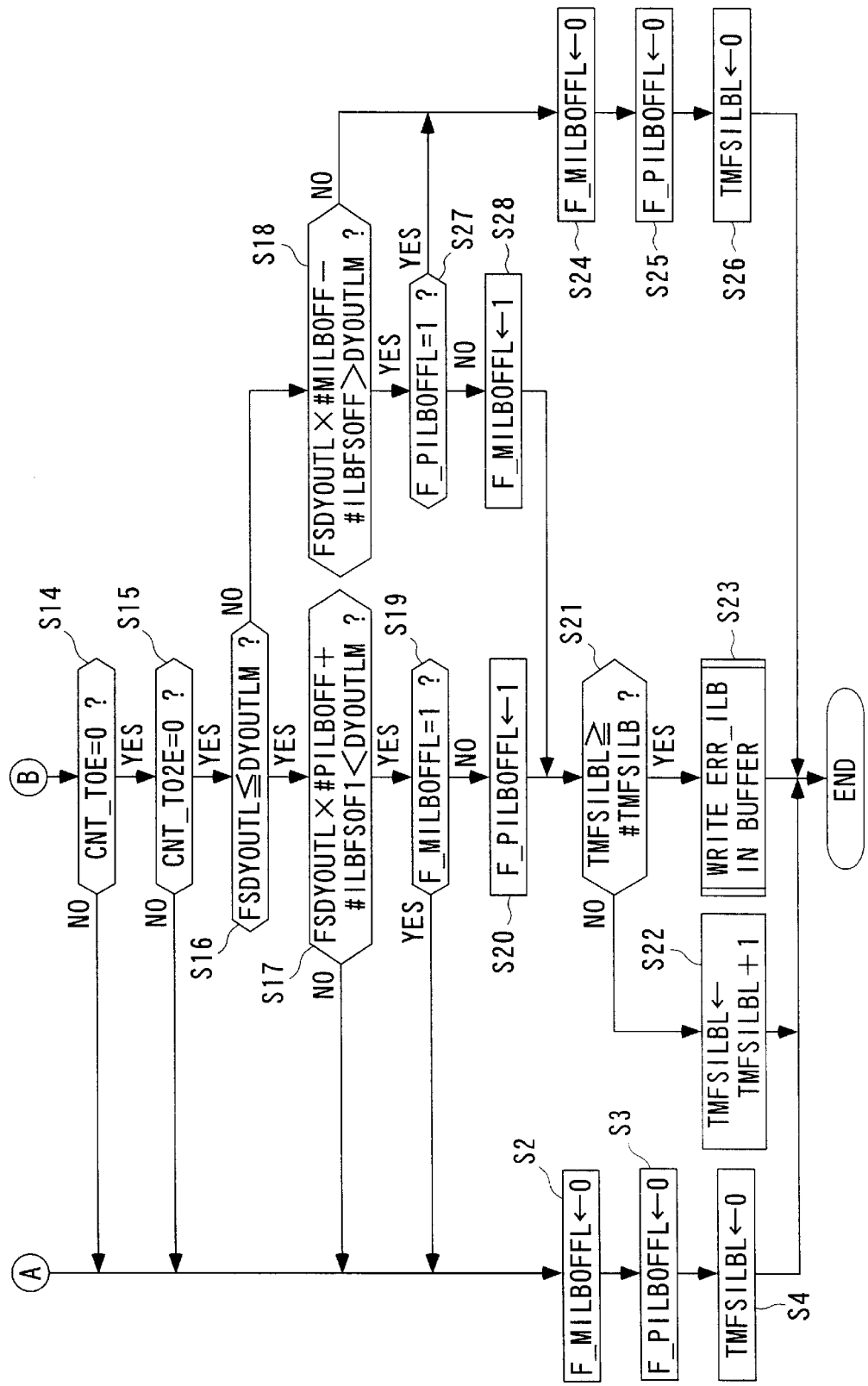
FIG. 4 is a flowchart showing a continuation of the FIG. 3 flowchart.

FIGS. 3 and 4 are flowcharts showing a control program for carrying out the failure determination process. The control program is carried out at predetermined time intervals. It should be noted that because this failure determination process is executed on each of the electromagnetic clutches 10, 10 in the same manner, in the following, the process carried out on the left electromagnetic clutch 10 will be described by way of example. It should be noted that in the following description, a mark # is added to each of heads of symbols designating fixed values that are stored beforehand in the ROM as data items and table values, so as to show the fixed values in a state distinguishable from other variables that are stored in the RAM and updated.

In this process, first, it is determined at a step Si whether or not an after-start flag $F_{13}$ IGDLY 2 indicating that this is not immediately after the start of the engine 3 assumes "1". If the answer to this question is negative (No), i.e., if it is immediately after the start of the engine 3, it is judged that an operating condition of the 2–4WD·ECU 11 is not stable, so that without executing the failure determination process, a reduced resistance-side failure determination-executing flag F_MILBOFFL, an increased resistance-side failure determination-executing flag F_PILBOFFL, and a failure determination timer TMFSILBL, all of which are referred to hereinafter, are reset to "0" at respective steps S2 to S4, followed by terminating the program.

If the answer to the question of the step S1 is affirmative (Yes), it is determined at steps S5 and S6 whether or not a fail safe relay flag F_FSR indicative of an ON-state of a fail safe relay, and a fail safe relay stabilization wait flag F_FSRNOR indicating that a stabilization wait time period has elapsed after the fail safe relay was turned on are equal to "1", respectively. If either of the answers to the above questions is negative (No), i.e. if the fail safe relay is in an OFF state, or if the stabilization wait time period has not yet elapsed after the fail safe relay was turned on, the above steps S2 to S4 are carried out without executing failure determination, followed by terminating the program.

If the answers to the questions of the steps S5 and S6 are affirmative (Yes), it is determined at a step S7 whether or not the desired current value ICMDL is equal to or smaller than a first predetermined value #CORGI. If the desired current value ICMDL is small, the output duty factor value DYOUTLM calculated based on the desired current value ICMDL is prone to variation, and hence an error is liable to occur in failure determination, described hereinbelow, which is carried out by using the output duty factor value DYOUTLM. Therefore, if the answer to the question of the step S7 is affirmative (Yes), i.e. if ICMDL≦#CORGI holds, failure determination is inhibited, and the program proceeds to the above steps S2 to S4.

If the answer to the question of the step S7 is negative (No), i.e., if ICMDL>#CORGI holds, it is determined at a step S8 whether or not the detected actual current value ILOLM is equal to "0". If ILOLMO=0 holds, the output duty factor value DYOUTLM is also small, and an erroneous determination of a failure of the electromagnetic clutch 10 is liable to occur. Hence, in this case as well, failure determination is not carried out, and the program proceeds to the above steps S2 to S4.

If the answer to the question of the step S8 is negative (No), it is determined at a step S9 whether or not the difference |ICMDL−ILOLM| between the desired current value ICMDL and the actual current value ILOLM is smaller than a second predetermined value #DICMDLO. According to the present embodiment, the detection of a failure of the electromagnetic clutch 10 is carried out by comparing the output duty factor value DYOUTLM calculated when the actual current value ILOLM has converged on the desired current value ICMDL with a reference duty factor value FSDYOUTL, referred to hereinafter, Therefore, if the answer to the question of the step S9 is negative (No), i.e. if |ICMDL−ILOLM|≧#DICMDLO holds, it is judged that preconditions for carrying out failure determination are not satisfied, and hence failure determination is inhibited. Then, the above steps S2 to S4 are executed, followed by terminating the program.

Figure 5:
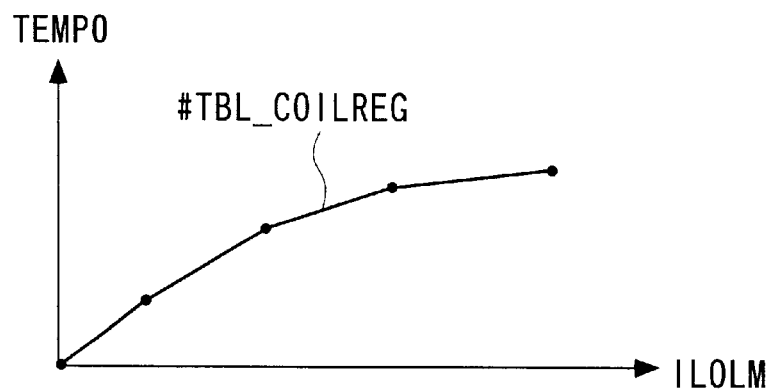
FIG. 5 is a diagram showing an example of an ILOLM-TEMPO table.

If the answer to the question of the step S9 is affirmative (Yes), i.e.1 if |ICMDL-ILOLM|#DICMDLO holds, the reference duty factor value FSDYOUTL is calculated at steps S10 to S13. First, at the step S10, an ILOLM-TEMPO table, an example of which is illustrated in FIG. 5, is looked up according to the actual current value ILOLM, whereby a table value #TBL_COILREG is determined and set to a basic value TEMPO (reference control value). This table represents a standard relationship between the actual current amount ILOLM and the output duty factor value DYOUTLM, which is found when the coil 42 of the electromagnetic clutch 10 is under a normal temperature condition, and a power supply voltage $AD_{13}$ PSOL applied to the electromagnetic clutch 10 is a normal voltage. The table is built up empirically or by experiments. The table value #TBL_COILREG is set in this table according to the above relationship such that the same becomes larger as the actual current value ILOLM increases.

Figure 6:
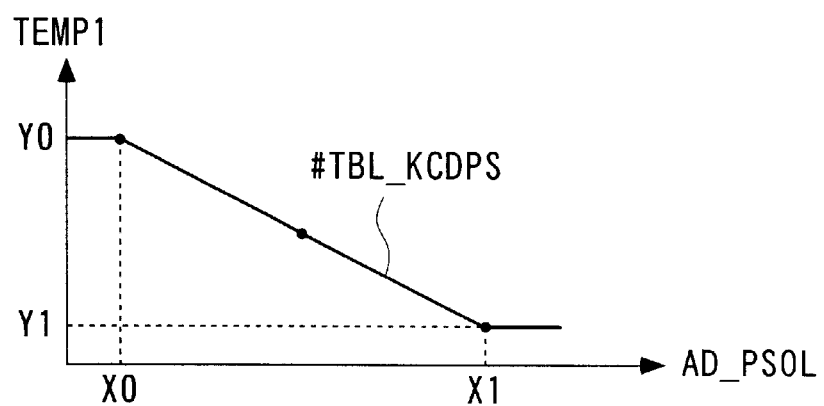
FIG. 6 is a diagram showing an example of an AD_PSOL-TEMP1 table.

Next, at the step S11, an AD_PSOL-TEMP1 table, an example of which is illustrated in FIG. 6, is looked up according to the power supply voltage AD_PSOL applied to the electromagnetic clutch 10, whereby a table value #TBL_KCOPS is determined and set to a voltage-dependent correction coefficient TEMP1. In this table, the table value #TBL_KCOPS is set to a predetermined value Y0 when the power supply voltage AD_PSOL is equal to or smaller than a predetermined voltage X0, and the same is set to a predetermined value Y1 smaller than the predetermined value Y0 when the power supply voltage AD_PSOL is equal to or larger than a predetermined voltage X1 (X1>X0). When the power supply voltage AD_PSOL is between the predetermined voltages X0 and X1, the table value #TBL_KCOPS is set such that it becomes smaller as the power supply voltage AD_PSOL increases. This is to correct the reference duty factor value FSDYOUTL according to a decrease in the output duty factor value DYOUTLM required for an identical value of the current amount ILOLM of the coil 42 of the electromagnetic clutch, which decrease occurs as the power supply voltage AD_PSOL increases.

Figure 7:
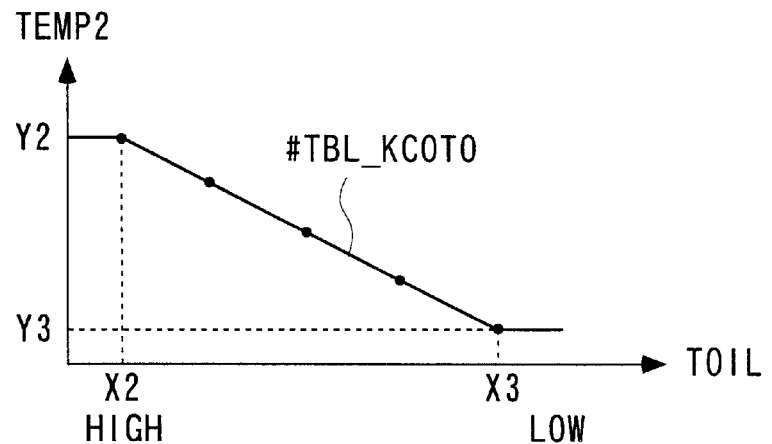
FIG. 7 is a diagram showing an example of a TOIL-TEMP2 table.

Next, at the step S12, a TOIL-TEMP2 table, an example of which is illustrated in FIG. 7, is looked up according to the oil temperature TOIL sensed by the oil temperature sensor 24, whereby a table value #TBL_KCOTO is determined and set to a temperature-dependent correction coefficient TEMP2. In this table, the table value #TBL__KCOTO is set to a predetermined value Y3 when the oil temperature TOIL is equal to or lower than a predetermined temperature X3, and the same is set to a value Y2 larger than the predetermined value Y3 when the oil temperature TOIL is higher than a predetermined temperature X2 (>X3). When the oil temperature TOIL is between the predetermined temperatures X3 and X2, the table value #TBL__KCOTO is set in this table such that it becomes smaller as the oil temperature TOIL becomes lower. This is to correct the reference duty factor value FSDYOUTL according to a decrease in the output duty factor value DYOUTLM required for an identical value of the current amount ILOLM of the coil 42 of the electromagnetic clutch, which decrease occurs as the temperature of the coil 42 decreases causing a decrease in the resistance value of the coil 42.

Then, at the step S13, the basic value TEMPO obtained at the above step S10 is multiplied by the voltage-dependent correction coefficient TEMP1 and the temperature-dependent correction coefficient TEMP2 obtained at the respective steps S11 and S12, to calculate the reference duty factor value FSDYOUTL.

Then, it is determined at respective steps S14 and S15 whether or not values of first and second failure determination counters CNT__TOE, CNT__TO2E are equal to "0". If either of the answers to these questions is negative (No), this means that failure determination of the oil temperature sensor 24 is being carried out, so that the above steps S2 to S4 are carried out without carrying out the determination of a failure of the electromagnetic clutch 10, followed by terminating the program.

If the answers to the questions of the steps S14 and S15 are affirmative (Yes), it is determined at a step S16 whether or not the reference duty factor value FSDYOUTL calculated at the step S13 is equal to or smaller than the output duty factor value DYOUTLM. If the answer to this question is affirmative (Yes), i.e. if the present output duty factor value DYOUTLM is equal to or larger than the reference duty factor value FSDYOUTL, the program proceeds to a step S17 for carrying out increased resistance-side failure determination of the coil 42, wherein an increased resistance-side final comparison value FSDYOUTL1 of the reference duty factor value is calculated by using the following equation (1):

$$FSDYOUTL1 = FSDYOUTL \times \#PILBOFF + \#ILBFSOF1 \quad (1)$$

and it is determined whether or not the value FSDYOUTL1 calculated is smaller than the output duty factor value DYOUTLM.

In the above equation, #PILBOFF represents an increasing multiplication term (>1) used for the purpose of providing a normal range (first range) of the output duty factor value DYOUTLM extended in an increasing direction with respect to the reference duty factor value FSDYOUTL, and #ILBFSOF1 represents an addend term used for the same purpose.

On the other hand, if the answer to the question of the step S16 is negative (No), i.e. if the output duty factor value DYOUTLM is smaller than the reference duty factor value FSDYOUTL, the program proceeds to a step S18 for carrying out decreased resistance-side failure determination of the coil 42, wherein a decreased resistance-side final comparison value FSDYOUTL2 of the reference duty factor value is calculated by using the following equation (2):

$$FSDYOUTL2 = FSDYOUTL \times \#MILBOFF - \#ILBFSOFF \quad (2)$$

and it is determined whether or not the value FSDYOUTL2 calculated is larger than the output duty factor value DYOUTLM.

In the above equation, #MILBOFF represents a decreasing t multiplication term (<1) for the purpose of providing a normal range (second range) of the output duty factor value DYOUTLM extended in an decreasing direction with respect to the reference duty factor value FSDYOUTL, and #ILBFSOFF represents a subtrahend term used for the same purpose.

Figure 8:
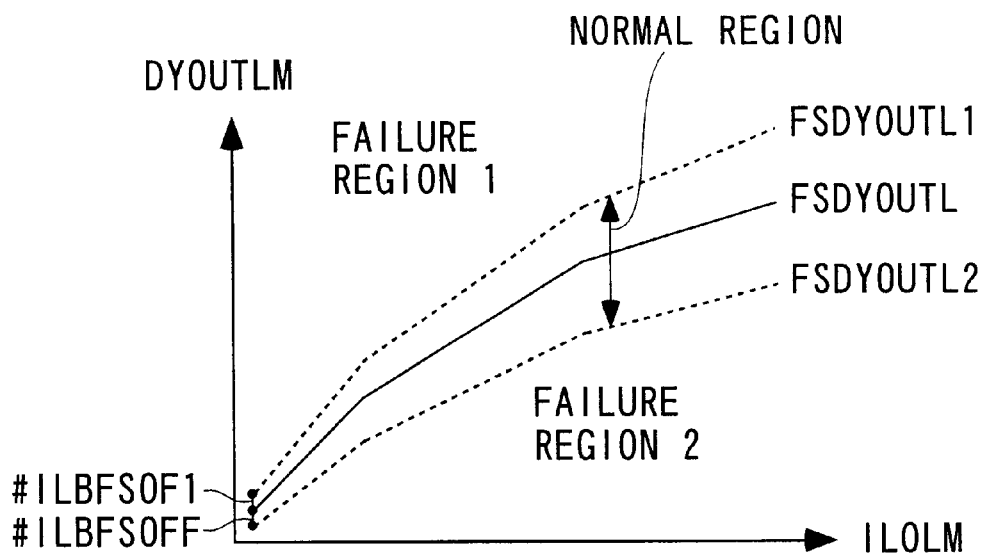
FIG. 8 is a diagram showing an example of a failure determination map.

FIG. 8 shows a determination map which is formed based on the reference duty factor value FSDYOUTL, the increased resistance-side and decreased resistance-side final comparison values FSDYOUTL1 and FSDYOUTL2 calculated as above. More specifically, the increased resistance-side final comparison value FSDYOUTL1 is obtained by increasing the reference duty factor value FSDYOUTL by using the increasing multiplication term #PILBOFF and the addend term #ILBFSOF1 according to the above equation (1). Similarly, the decreased resistance-side final comparison value FSDYOUTL2 is obtained by decreasing the reference duty factor value FSDYOUTL by using the decreasing multiplication term #MILBOFF and the subtrahend term #ILBFSOFF. A region between the increased resistance-side and decreased resistance-side final comparison values FSDYOUTL1 and FSDYOUTL2 is defined as a normal region (first range+second range). Further, a region above the level of the increased resistance-side final comparison value FSDYOUTL1 is defined as a failure region 1 on the increased resistance-side, while a region below the level of the decreased resistance-side final comparison value FSDYOUTL2 is defined as a failure region 2 on the decreased resistance-side.

Therefore, if the answer to the question of the step S17 is negative (No), i.e. if FSDYOUTL1 $\geq$ DYOUTLM holds, it is determined that the coil 42 of the electromagnetic clutch 10 is normal, since the present output duty factor value DYOUTLM is in the normal region of the determination map, and the above steps S2 to S4 are carried out, followed by terminating the program.

On the other hand, if the answer to the question of the step S17 is affirmative (Yes), i.e. if FSDYOUTL1<DYOUTLM holds, it is judged that a failure of the coil 42 of the electromagnetic clutch 10 has occurred on the increased resistance-side.

Next, it is determined at a step S19 whether or not the decreased resistance-side failure determination-executing flag F__MILBOFFL assumes "1".

As described hereinbelow, this flag F__MILBOFFL is set to "1" when it is judged that the output duty factor value DYOUTLM is in the failure region 2, and it is being determined whether or not a failure of the electromagnetic clutch 10 has occurred on the decreased resistance-side. Hence, if the answer to the question of the step S19 is affirmative (Yes), it means that the output duty factor value DYOUTLM has been shifted from the failure region 2 to the failure region 1 by skipping the normal region, so that it is judged that the reliability of the failure determination is questioned, and the failure determination is cancelled to carry out the above steps S2 to S4.

On the other hand, if the answer to the question of the step S19 is negative (No), the increased resistance-side failure determination-executing flag F__PILBOFFL is set to "1" at a step S20 so as to indicate that failure determination is being carried out on the increased resistance-side. Next, it is determined at a step S21 whether or not the count of the failure determination timer TMFSILBL is equal to or larger than a predetermined value #TMFSILB (corresponding to 3 seconds, for instance) thereof. If the answer to this question is negative (No), i.e. if TMFSILBL<#TMFSILB holds, the count of the failure determination timer TMFSILBL is incremented by "1" at a step S22, followed by terminating the program. On the other hand, if the answer to the question of the step S21 is affirmative (Yes), i.e. if TMFSILBL≧#TMFSILB holds, it is finally determined that a failure has occurred on the increased resistance-side, since the above condition regarded as a state of occurrence of the failure has continued for a predetermined time period, and an error code ERR_ILB for indicating the occurrence of the failure is written in a corresponding buffer at a step S23, followed by terminating the program.

On the other hand, if the answer to the question of the above step S18 is negative (No), i.e. if FSDYOUTL2≦DYOUTLM holds, it is judged that the coil 42 of the electromagnetic clutch 10 is normal, since the output duty factor value DYOUTLM is in the normal region of the determination map, and the steps S24 to S26 for execution of the same processes as carried out at the above steps S2 to S4, respectively, are executed, followed by terminating the program.

On the other hand, if the answer to the question of the above step S18 is affirmative (Yes), i.e. if FSDYOUTL2>DYOUTLM holds, it is determined that a failure of the coil 42 of the electromagnetic clutch 10 has occurred on the decreased resistance-side e.g. due to a layer short-circuit, since the output duty factor value DYOUTLM is in the failure region 2 of the determination map.

The following steps can be carried out in the same manner as carried out in the case of determination of a failure on the increased resistance-side. That is, it is determined at a step S27 whether or not the increased resistance-side failure determination-executing flag F_PILBOFFL assumes "1", and if the answer to this question is affirmative (Yes), the program proceeds to the above steps S24 to S26, whereas if the answer to the question is negative (No), the decreased resistance-side failure determination-executing flag F_MILBOFFL is set to "1" at a step S28. Then, the above-mentioned steps S21 to S23 are carried out, and after the failure determination timer TMFSILBL has measured a predetermined time period, it is finally determined that a failure of the coil 42 of the electromagnetic clutch 10 has occurred on the decreased resistance-side, followed by terminating the program.

As described hereinabove, according to the present embodiment, the output duty factor value DYOUTLM of current to be supplied to the coil 42 of the electromagnetic clutch 10 is calculated by feedback control such that the actual current value ILOLM becomes equal to the desired current value ICMDL, and the output duty factor value DYOUTLM obtained when the actual current value ILOLM has converged on the desired current value ICMDL is compared with the reference duty factor value FSDYOUTL corresponding to the present actual current value ILOLM, whereby it is possible to properly determine whether or not the coil 42 of the electromagnetic clutch 10 has failed due to a change in the resistance value thereof.

Further, the reference duty factor value FSDYOUTL is corrected by using the oil temperature TOIL detected as the coil temperature, and the power supply voltage AD_PSOL, both affecting the output duty factor value DYOUTLM. This makes it possible to more properly carry out failure determination while accommodating influences of the oil temperature and the power supply voltage on the amount of current flowing through the coil. Further, failure determination is inhibited when the desired current value ICMDL is small, or when the actual current value ILOLM=0 holds, whereby it is possible to prevent erroneous determination of a failure of the electromagnetic clutch, which is caused by a variation in the output duty factor value DYOUTLM or the like.

The invention is not necessarily limited to the above embodiment, but it can be put into practice in various forms. For instance, although in the present embodiment, correction by using the oil temperature TOIL and the power supply voltage AD_PSOL is carried out on the reference duty factor value FSDYOUTL, this is not limitative, but such correction may be carried out on the output duty factor value DYOUTLM, or on both of the reference duty factor value FSDYOUTL and the output duty factor value DYOUTLM. Further, although in the present embodiment, the oil temperature TOIL is employed as a temperature representative of the temperature of the coil 42, this is not limitative, but the temperature of the coil 42 may be directly detected by a sensor.

Still further, although in the present embodiment, the electromagnetic clutches according to the invention are used in the torque control system of the four-wheel drive vehicle by way of example, this is not limitative, but the invention can be widely applied to an electromagnetic clutch which is configured such that the control amount for controlling the amount of current flowing through its coil is feedback-controlled, whatever the use of the clutch may be.

It is further understood by those skilled in the art that the foregoing is a preferred embodiment of the invention, and that various changes and modifications may be made without departing from the spirit and scope thereof.

What is claimed is:

1. An apparatus for determining a failure of an electromagnetic clutch including a solenoid having a coil, said electromagnetic clutch being configured such that an engagement force thereof is varied according to an amount of current flowing through said coil of said solenoid, and that an output control value for control of said amount of current is calculated by feedback control such that an actual amount of current actually flowing through said coil becomes equal to a desired amount of current, the apparatus comprising:
    storage means for storing a predetermined reference control value defining a standard for said output control value, said predetermined reference control value having a standard relationship with respect to said amount of current;
    actual current amount detection means for detecting said actual amount of current;
    comparison means for comparing the calculated output control value with said predetermined reference control value corresponding to the detected actual amount of current; and
    failure determination means for determining based on a result of the comparison by said comparison means whether or not said electromagnetic clutch has failed due to a change in a resistance value of said coil of said solenoid thereof.

2. An apparatus according to claim 1, further including coil temperature detection means for detecting a temperature of said coil, and wherein said comparison means compares a value of at least one of said output control value and said predetermined reference control value, which is corrected according to the detected temperature of said coil, with another of said output control value and said predetermined reference control value.

3. An apparatus according to claim 1, wherein said comparison means compares a value of at least one of said output control value and said predetermined reference control value, which is corrected according to a voltage applied to said coil, with another of said output control value and said predetermined reference control value.

4. An apparatus according to claim 1, further including failure determination inhibition means for inhibiting failure determination from being carried out by said failure determination means when said desired amount of current is equal to or smaller than a first predetermined value or when a difference between said desired amount of current and said actual amount of current is equal to or larger than a second predetermined value.

5. An apparatus according to claim 1, wherein when the calculated output control value is larger than said predetermined reference control value, said comparison means further compares said output control value with an increased-side reference control value, said increased-side reference control value being obtained by increasing said predetermined reference control value to a predetermined extent, whereas when the calculated output control value is smaller than said predetermined reference control value, said comparison means further compares said output control value with a decreased-side reference control value, said decreased-side reference control value being obtained by decreasing said predetermined reference control value to a predetermined extent.

6. An apparatus according to claim 1, wherein said predetermined reference control value is defined as a value of said output control value to be assumed with respect to said actual amount of current when said coil is under a normal temperature condition, and at the same time a voltage applied to said coil is a normal voltage.

7. An apparatus according to claim 1, wherein said storage means stores said predetermined reference control value in the form of a table of values of said predetermined reference control value correlated to respective values of said actual amount of current.

8. The apparatus according to claim 1, wherein said output control value is a duty factor value for pulse current.

* * * * *